(12) United States Patent
Habeger (10) Patent No.: US 10,631,527 B1
(45) Date of Patent: Apr. 28, 2020

(54) FISHING LURE WITH A SCENT DISBURSEMENT APPARATUS

(71) Applicant: Donald Habeger, Juneau, AK (US)

(72) Inventor: Donald Habeger, Juneau, AK (US)

( * ) Notice: Subject to any disclaimer, the term of this patent is extended or adjusted under 35 U.S.C. 154(b) by 371 days.

(21) Appl. No.: 15/652,702

(22) Filed: Jul. 18, 2017

(51) Int. Cl.
*A01K 85/01* (2006.01)
*A01K 83/00* (2006.01)
*A01K 85/08* (2006.01)

(52) U.S. Cl.
CPC ............ *A01K 85/01* (2013.01); *A01K 83/00* (2013.01); *A01K 85/08* (2013.01)

(58) Field of Classification Search
CPC ........ A01K 83/00; A01K 85/01; A01K 85/08; A01K 95/00; A01K 97/02
USPC ........... 43/42.05, 42.06, 42.26, 42.27, 42.28, 43/42.5, 43.1, 44.9, 44.99, 42.25
See application file for complete search history.

(56) References Cited

U.S. PATENT DOCUMENTS

| | | | | |
|---|---|---|---|---|
| 3,564,754 A * | 2/1971 | Brawley | ............ | A01K 85/00 43/42.26 |
| 3,568,354 A * | 3/1971 | Yacko | ............ | A01K 85/01 43/17.6 |
| 3,690,028 A * | 9/1972 | Walker, Jr. | ............ | A01K 85/08 43/17.6 |
| 3,867,781 A * | 2/1975 | Wolfe | ............ | A01K 85/00 43/42.09 |
| 4,033,063 A * | 7/1977 | Mize | ............ | A01K 85/00 43/42.05 |
| 4,736,542 A * | 4/1988 | Floyd | ............ | A01K 85/00 43/42.06 |
| 4,773,181 A * | 9/1988 | Radden | ............ | A01K 85/08 43/42.25 |
| 4,785,572 A * | 11/1988 | Crumley | ............ | A01K 85/00 43/42.05 |
| 5,491,927 A * | 2/1996 | Ortiz | ............ | A01K 85/00 43/42.28 |
| 5,517,782 A * | 5/1996 | Link | ............ | A01K 85/00 43/42.06 |
| 6,185,857 B1 * | 2/2001 | Hnizdor | ............ | A01K 85/00 43/42.11 |
| 6,357,167 B1 * | 3/2002 | Bradford | ............ | A01K 85/00 43/42.05 |
| 9,655,353 B1 * | 5/2017 | Hudson | ............ | A01K 85/18 |
| 2003/0163945 A1 * | 9/2003 | Okada | ............ | A01K 85/08 43/42.36 |
| 2004/0216357 A1 * | 11/2004 | Bobrowski | ............ | A01K 85/01 43/42.06 |

(Continued)

*Primary Examiner* — Darren W Ark
*Assistant Examiner* — Brady W Frazier
(74) *Attorney, Agent, or Firm* — Michael J. Tavella (57) ABSTRACT

A fishing lure made of soft yarn ball that had a hole through the center. The fibrous ball increases the holding power of scent oil. The ability to hold more scent oil means that it takes longer for the scent oil to work out of the ball and thus leaves a longer lasting and larger scent trail for game fish to hone in on. The scent ball is easily adaptable to any type of artificial lure rigging a fisherman chose to use. The soft yarn balls are made from materials used in fly tying. These fibrous products come in highly visible colors. Some even have UV responding dyes that fish respond to. As noted above, the center hole is a carbon fiber micro tube. It is this use of the micro tube that allows the yarn to be tied sufficiently tight to allow for extending holding of the scent oils.

19 Claims, 6 Drawing Sheets

(56) References Cited

U.S. PATENT DOCUMENTS

| | | | |
|---|---|---|---|
| 2006/0005455 A1* | 1/2006 | Berge | A01K 85/01 43/42.06 |
| 2006/0005457 A1* | 1/2006 | Harris | A01K 85/01 43/42.06 |
| 2008/0295385 A1* | 12/2008 | Shelton | A01K 85/00 43/42.25 |
| 2010/0205848 A1* | 8/2010 | Hughes | A01K 85/16 43/42.15 |
| 2010/0263259 A1* | 10/2010 | Cuthbert | A01K 85/08 43/42.25 |
| 2016/0366863 A1* | 12/2016 | Caraballo, Sr. | A01K 85/08 |
| 2017/0290311 A1* | 10/2017 | Harr | A01K 85/01 |

* cited by examiner

FISHING LURE WITH A SCENT DISBURSEMENT APPARATUS

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to fishing lures and particularly to fishing lures having a scent disbursement apparatus.

2. Description of the Prior Art

In the world of fishing lures, there is a need to increase the absorption of scent oils into a lure and ultimately, the distribution of a scent trail from that lure to attract game fish-in particular salmon. The problem with the prior art lures is inducing a scent trail while using an artificial lure setup. Most salmon lures, for example, are smooth bodied metal, wood, soft plastic, or hard plastic. When scent oils are applied to these artificial lure setups and set in the water, an oil sheen immediately formed on the water's surface. When the artificial lure was retrieved after tolling, no overt evidence existed (could not feel or smell the scent product) that the scent oil remained for any length of time on the lure. It appears that the problem with such lures is that the scent oils leave the lure after a very short time and were not as effective during a troll.

Examples of lures with scent balls or other containers are found in the following U. S. Patents. U.S. Pat. No. 4,799,328 to Goldman, teaches a fishing bobber that has a holder and a means for emitting scent. U.S. Pat. No. 6,161,324 to Hugunin, teaches a lure that has a tab for deploying scent. U.S. Pat. No. 5,333,405 to Bowles teaches a soft plastic fishing lure that contains micro-encapsulated liquid fish attractants. U. S. Published application 2008/0190009 teaches a lure that uses elastomeric materials to form egg-shaped members that simulate eggs for attracting fish. U. S. Published Application No. 2011/0214332 teaches a lure that has a sleeve that fits over the top of the lure. The sleeve holds a quantity of fish scent for attracting fish. Finally, U. S. Published application 2013/0031822 teaches a worm-like artificial lure that contains fish scent. Holes in the body of the lure allow the scent to escape the lure to attract fish. All of those lures use some type of solid body to hold the fishing scents. While useful, they do not provide a soft, yarn type body for a lure.

Fishing lures that use yarn type bodies, are typically tied directly onto the shaft of a hook. Two examples of this type of lure are U.S. Pat. Nos. 3,690,028 and 4,773,281. Note that the later patent teaches simulated eggs made of clusters of yarn that are tied by thread and then tied to the hook shaft. Although these lures use yarn, there is no way to use the balls in other ways once they are tied to the shaft of the hook. Moreover, ether is no way to string them onto a line to form other configurations of these balls. Thus, these designed are limited in their use.

Another common lure option for fishing is rigging up a once-frozen herring. a thawed herring most likely gives off a scent trail, but since the soft flesh gives way during trolling, lure presentation become less that natural. Thus, there is a need for a longer lasting artificial lure with the added ability to lay down a long-term scent trail.

BRIEF DESCRIPTION OF THE INVENTION

The invention consists of a soft yarn ball that had a hole through the center. The fibrous ball increases the holding power of scent oil. The ability to hold more scent oil means that it takes longer for the scent oil to work out of the ball and thus leaves a longer lasting, and larger scent trail for game fish to hone in on and thus bring an increase to fish strikes. The use of a center tube allows the scent ball to be easily adapted to any type of artificial lure rigging a fisherman chose to use. The soft yarn ball has a center tube portion to allow it to be threaded onto a fishing line. In fact, if a fisherman so desired, a scent ball can be tied in with a herring bait setup to increase the scent trail of natural bait.

The soft yarn balls are made from materials used in fly tying. These fibrous products come in highly visible colors. Some even have UV responding dyes that fish respond to. As noted above, at the center is a carbon fiber micro tube. It is this use of the micro tube that allows the yarn to be tied sufficiently tight to allow for extending holding of the scent oils.

DETAILED DESCRIPTION OF THE INVENTION

Figure 1:
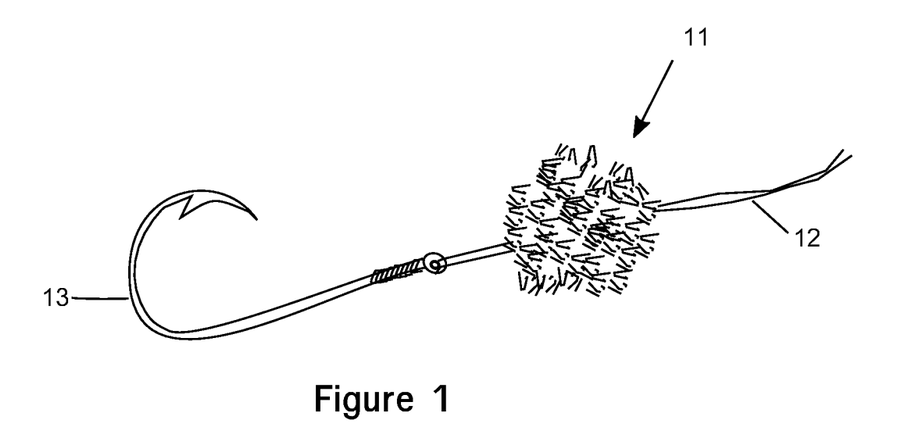
FIG. 1 is an environmental perspective view of the scent dispersion lure on a fishing line.
Figure 2:
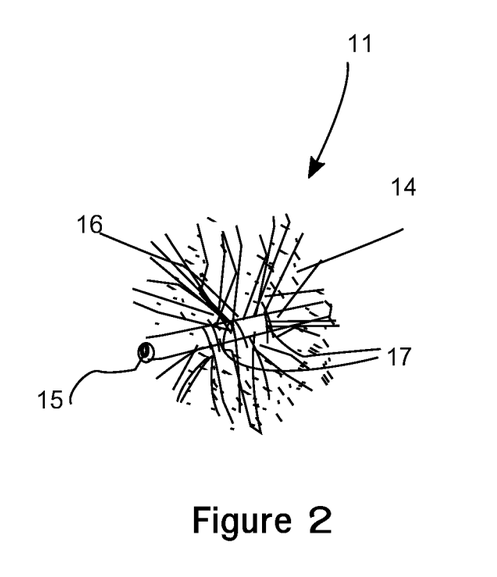
FIG. 2 is a perspective view of the present invention with the fibers expanded to show the internal components.
Figure 3:
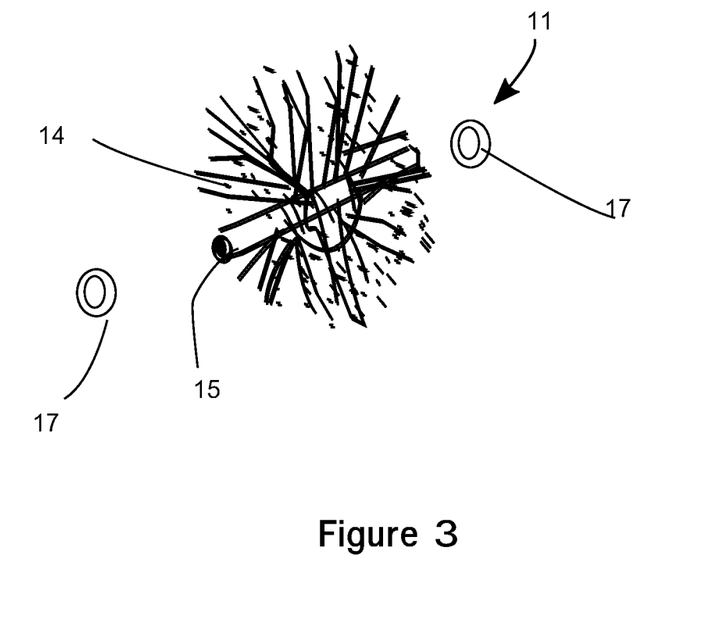
FIG. 3 is a partially exploded view of the invention showing the two outer holding rings removed from the center tube.

Referring now to the drawings and particularly to FIGS. 1-3, the present invention 11 is shown attached to a length of fishing line 12 that is tied to a fishing hook 13. This is only one of multiple ways in which the invention 11 may be used. This invention stimulates the fish strike response through color, movement of exterior body fiber in response to water currents or the retrieving or trolling of the lure, and the dispersion of scented fishing liquids, oils, sauces, and gels, as discussed below.

FIG. 2 is a perspective view of the invention 11 illustrating a spherical shaped soft body of the invention. The invention consists of a rigid center tube 15, a center securing and compression band 16, and two side securing and compression bands 17 that are on either side of the center band (see also FIG. 4). The shaped soft body 14 is comprised of a synthetic or natural filament material such as polyester, polypropylene, or wool yarns. The filament material 14 may have a single color that simulates naturally found food sources of a targeted game fish, or a multiple of highly visible and contrasting colors that might include UV enhanced dyes noticeable to game fish, or any combination of color and filament types thereof. The filament material 14 is attached to the micro-diameter rigid wall tube 15 that is able to withstand distortional forces of the compression bands 16 and 17 which are comprised of wound thread, pressed metal, rubber O-rings or any other such type of material. The center securing compression band 16 holds a bundle of filament material on the rigid wall tube 15 so that filament completely or partially surrounds the tubing. Adhesive may be applied to the rigid wall tube 15 to further secure the filament material. The two side compression bands 17 are made of similar material as the center compression band 16 and are secured to the rigid wall tube 15 with or without filament material, between the inner compression band surface and the rigid wall tube 15, and are pushed up as close as possible to the center band. The side compression bands 17 are pushed up tightly to the center compression band 16 and aid in the flaring of the filament material so that the exterior of the soft body of the invention 11 can be shaped.

FIG. 3 is a partially exploded view of the invention 11 further illustrating the components of the soft body filament material 14, the rigid wall tube 15, the center compression ring 16, and the two side compression rings 17.

Figure 4:
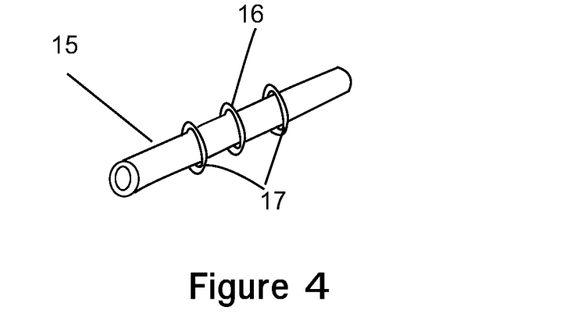
FIG. 4 is a perspective view of the center tube with the holding rings in place.
Figure 5:
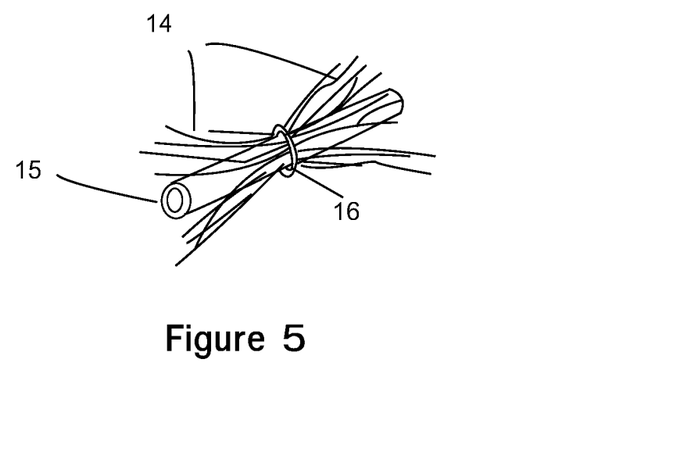
FIG. 5 is a perspective view of the carbon tube with the center ring holding some fibers in place.

FIG. 4 is a perspective view of the micro-diameter tube and the compression bands 16 and 17 and their relative positions on the rigid wall tube 15. Note, in the preferred embodiment, the micro diameter tube 15 is made of carbon fiber FIG. 5 is a perspective view of the center compression band 16 surrounding and securing the soft body filament material 14 to the rigid wall tube 15.

Figure 6:
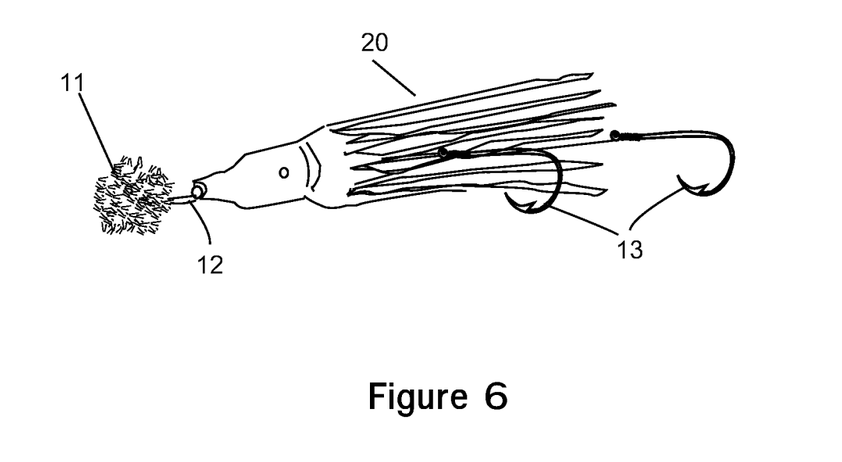
FIG. 6 is a perspective view of invention used in one configuration of the invention in combination with an artificial soft plastic squid like lure.

FIG. 6 is a perspective view of the invention 11 placed on a fishing line 12 in combination with an artificial soft plastic bait 20 with a two hook 13 terminal tackle set up. The selected positioning of the invention 11 allows for the soft body filament material to move in response to water currents as bait is retrieved, drifted, or trolled simulating the live action of natural feed. The multi stimuli fishing lure 11 adds natural or contracting colors to the bait setup to illicit the feeding response of game fish that prey on smaller creatures feeding in their natural elements, and when the invention is charged with scented fishing products, illustrated in FIG. 9, increases game fish enticement through activation of the game fish's chemoreception system.

Figure 7:
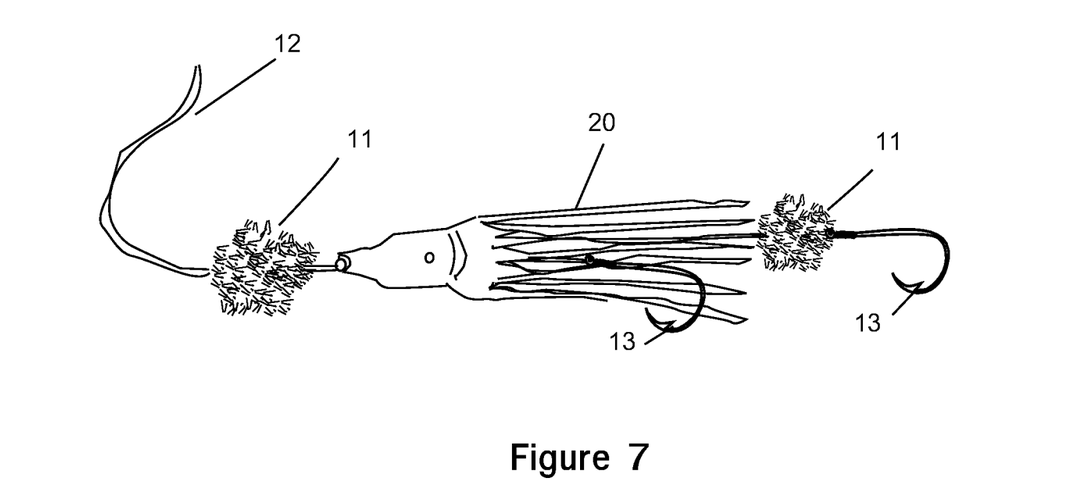
FIG. 7 is a perspective view of invention used in a second configuration of the invention in combination with an artificial soft plastic squid like lure.

FIG. 7 is a perspective view similar to FIG. 6 but with a second lure 11 placed on the fishing line 12 between an end hook 13 and an initial hook 13. All the aspects of soft body fiber movement, the options of natural prey or contrasting colors, and the selection of the same or different scent liquids, oils, sauces, and gels are added to the additionally placed multi stimuli fishing lures 11.

Figure 8:
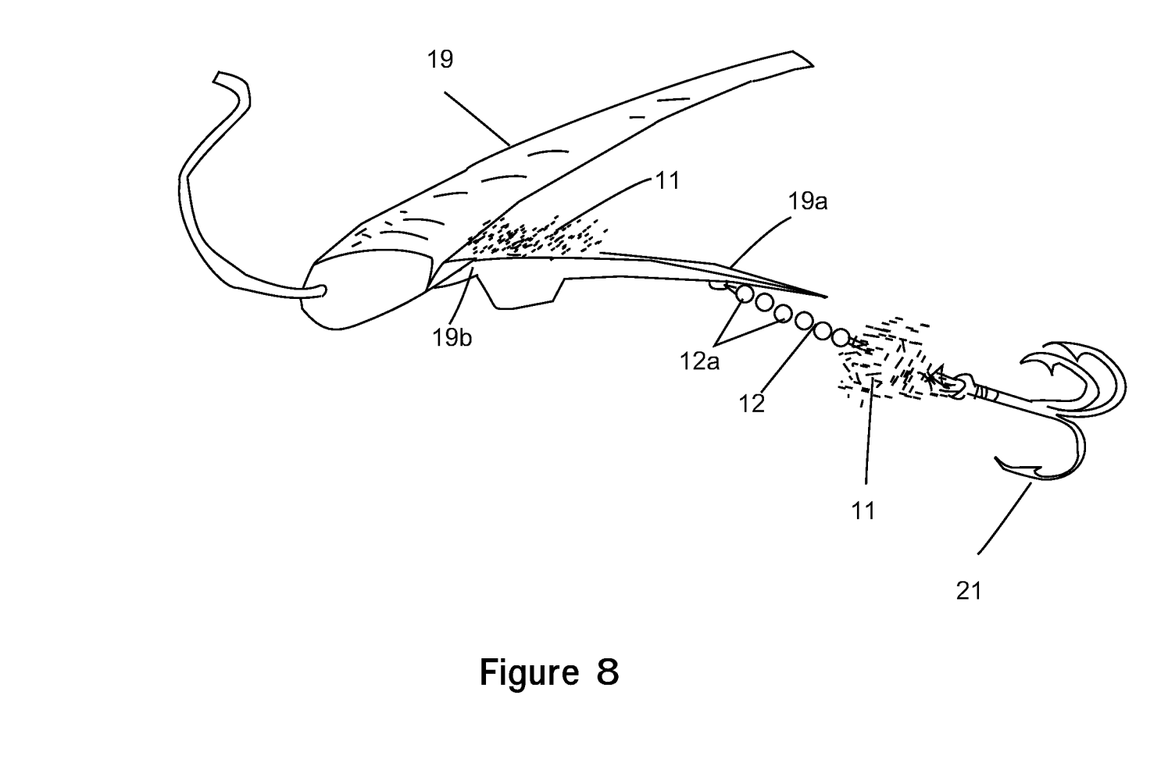
FIG. 8 is a perspective view of invention used in combination with an artificial hard plastic lure.

FIG. 8 is a perspective view of the invention 11 is used with an artificial hard plastic fishing lure 19. A treble fish hook 21 is tied to the end of the line, as shown. Next the invention 11 is threaded onto a line 12, that has spacer beads 12a threaded onto the line. The line is then passed through a tail hole 19a of the lure 19. Two more lures 11 are threaded onto the fishing line before the line is passed through the shoulder hole 19b of the artificial bait 19. FIG. 8 illustrates additional options available to the angler by stringing the invention 11 onto a fishing line and in combination with any bait setup.

Figure 9:
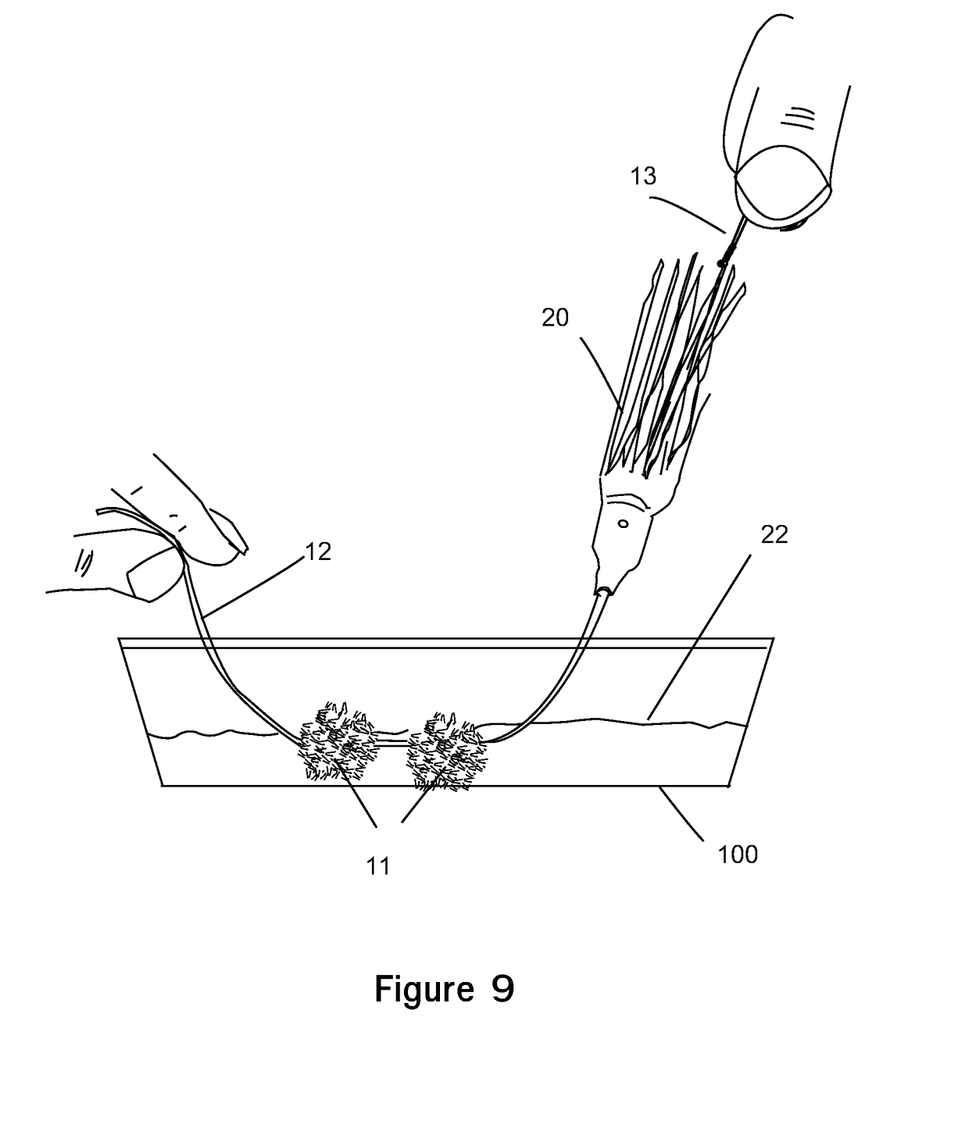
FIG. 9 is an environmental detail view invention, in combination with an artificial soft plastic lure, being charged with a scent product.

FIG. 9 is a perspective view of two lures of the invention 11 on a fishing line 12 ahead of an artificial soft plastic bait 20 with a fish hook 13 tied on the end. An angler may hold the fish line 12 at the end of the bait rigging with one hand and the hook 13 with the other, allowing the two lures 11 to be placed into a small container 100 that has a quantity of fish scent product 22. The angler may apply a fishing scent liquid, oil, sauce, or gel in this manner without touching the scent product.

Figure 10:
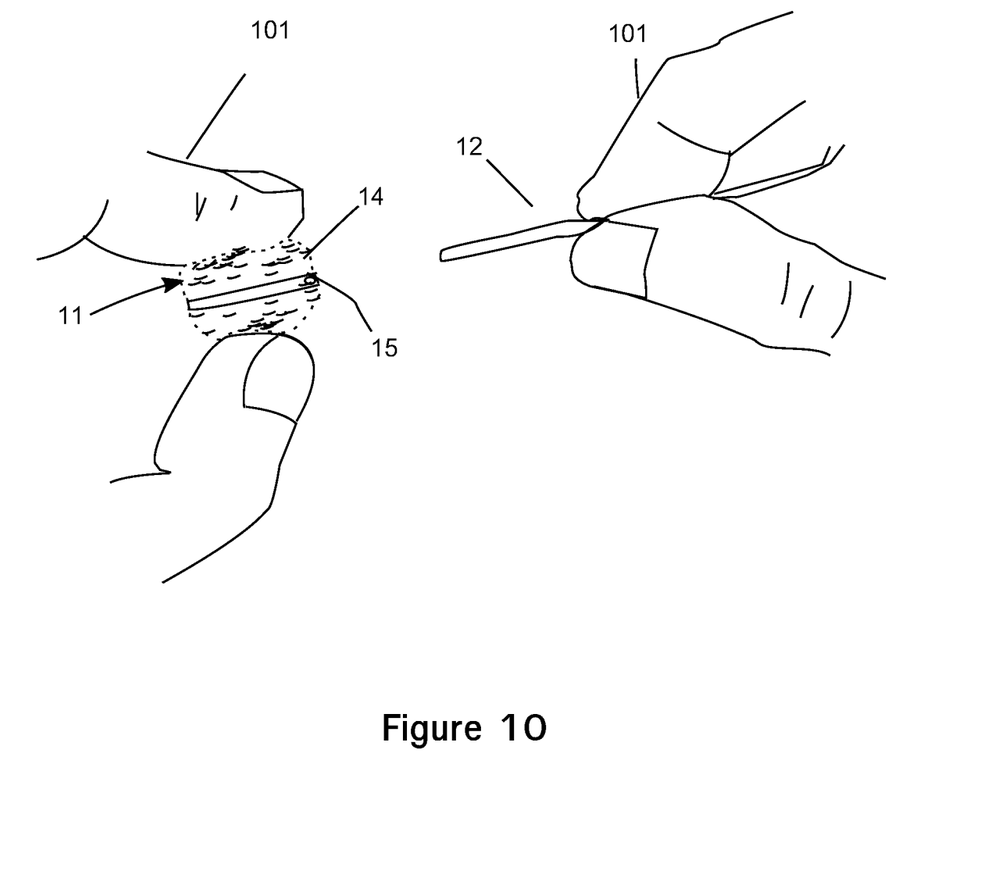
FIG. 10 is an environmental detail view of the invention being attached to a fishing line.

FIG. 10 is a perspective view of the invention 11 in a cross-section. This figure illustrates an angler attaching the invention 11 to a fish line 12 by aligning the end of the line 12 to one end of the rigid wall tube 15 and then inserting the line 12 through the tube so that the line 12 is fed through the length of the rigid wall tube 15. In this way, the invention 11 is placed on a fishing line for use.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A fishing lure with a scent disbursement apparatus comprising:
   a) a rigid wall tube having an outer surface;
   b) a quantity of filament material placed about the outer surface of said rigid wall tube such that said quantity of filament material forms a ball around said rigid wall tube, said ball having a first end on said rigid wall tube, and a second end on said rigid wall tube;
   c) a first compression band, placed over said quantity of filament material and said rigid wall tube to hold said filament material to said rigid wall tube
   d) a second compression band, placed under said quantity of filament material, over said rigid wall tube, and adjacent to said first end of said ball; and
   e) a third compression band, placed under said quantity of filament material, over said rigid wall tube, and adjacent to said second end of said ball.

2. The fishing lure of claim 1 further comprising: a quantity of adhesive, applied to the rigid wall tube to further secure said quantity of filament material to said rigid wall tube.

3. The fishing lure of claim 1 wherein a length of fishing line is placed through said rigid wall tube to position said fishing lure on said length of fishing line.

4. The fishing lure of claim 3 further comprising at least one fishing hook is secured to the length of fishing line.

5. The fishing lure of claim 1 wherein said fishing lure is coated with a quantity of fishing lure scent.

6. The fishing lure of claim 5 wherein the quantity of fishing scent liquid is selected from the group of: oil, sauce, and gel.

7. The fishing lure of claim 3 wherein said fishing lure is coated with a quantity of fishing lure scent.

8. The fishing lure of claim 7 wherein the quantity of fishing scent liquid is selected from the group of: oil, sauce, and gel.

9. The fishing lure of claim 4 wherein said fishing lure is coated with a quantity of fishing lure scent.

10. The fishing lure of claim 9 wherein the quantity of fishing scent liquid is selected from the group of: oil, sauce, and gel.

11. The fishing lure of claim 4 wherein the ball of said artificial fishing lure has a soft body.

12. The fishing lure of claim 4 wherein the ball of said artificial fishing lure has a hard body.

13. The fishing lure of claim 4, further comprising a second fishing hook, spaced apart spaced apart from said at least one hook on said length of fishing line.

14. The fishing lure of claim 4 wherein the at least one fishing hook is a treble hook.

15. The fishing lure of claim 1 wherein an artificial fishing lure is positioned on said length of fishing line in front of the rigid wall tube.

16. The fishing lure of claim 1 wherein an artificial fishing lure is positioned on said length of fishing line behind the fishing lure.

17. The fishing lure of claim 1 wherein the rigid wall tube is made of carbon fiber.

18. The fishing lure of claim 16 wherein a second fishing lure is tied behind said artificial fishing lure.

19. The fishing lure of claim 1 wherein said first, second and third compression bands are made of a material selected from the group of: wound thread, pressed metal, and rubber O-rings.

\* \* \* \* \*